United States Patent Office 2,767,187
Patented Oct. 16, 1956

2,767,187

ISOLATION OF GAMMA PICOLINE

Marvin O. Shrader and Harold L. Dimond, Pittsburgh, Pa., assignors to Pittsburgh Coke & Chemical Company, Pittsburgh, Pa., a corporation of Pennsylvania No Drawing. Application December 29, 1954,
Serial No. 478,526

16 Claims. (Cl. 260—270)

The present invention relates to the separation of gamma picoline (4-methyl-pyridine) from mixtures thereof with other nitrogen bases, such as beta picoline (3-methyl-pyridine) and 2,6-lutidine (2,6-dimethyl-pyridine).

The principal object of the present invention is to provide a practical and commercially attractive process for the isolation of substantially pure gamma picoline from mixtures thereof with beta-picoline and/or 2,6-lutidine.

A more specific object of the invention involves treatment of the ternary mixtures of pyridine bases known industrially as the "beta-gamma picoline fraction" for the separation of substantially pure gamma picoline therefrom.

A further object is to prepare a new gamma picoline copper chloride complex or addition compound.

Another object of the invention is to provide a process for obtaining substantially pure gamma picoline from binary mixtures of this base with beta picoline or 2,6-lutidine as result, for example, from prior treatment of the "beta-gamma picoline fraction" in conventional manner to separate either the beta-picoline or the 2,6-lutidine from the fraction.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Numerous procedures for the separation of gamma picoline from ternary or binary mixtures thereof, containing beta picoline and/or 2,6-lutidine, have been proposed and some have been employed commercially. However, each of these procedures has left much to be desired from the standpoint of economical operation, ease of operation, efficiency of recovery, and/or the realization of the base in sufficiently pure state as to be suitable for further synthesis of valuable and useful products, such as isonicotinic acid and 4-vinylidine.

It has been proposed in the past to separate beta-picoline from a mixture thereof with at least one of gamma-picoline and 2,6-lutidine by treating the mixture with copper sulfate to precipitate the beta picoline in the form of its copper sulfate addition compound and then separating the addition compound thus precipitated. In this prior art process, the amount of water is kept relatively low.

The precipitate formed in such process is treated with aqueous sodium hydroxide to convert the copper sulfate to copper oxide and dissolve the complex. The beta picoline is recovered by steam distillation and salting out of the distillate with sodium chloride.

It has now been surprisingly found that, if a mixture containing gamma picoline and either or both of beta-picoline and 2,6-lutidine are treated with copper sulfate in the presence of sufficient water to maintain the mixture in solution and that, if sodium chloride is added to this mixture, instead of an insoluble beta-picoline addition compound being formed, an insoluble gamma-picoline addition compound is formed, the beta picoline complex staying in solution. This is unexpected and directly contrary to the results obtained in the prior art method referred to supra. It has further been found that the precipitate is not caused merely by a salting out effect, but that the sodium chloride actually enters into the reaction so that the cupric chloride-amine complex of gamma-picoline is formed.

This complex is believed to be a new compound. It is useful as an intermediate in preparing gamma-picoline in substantially pure form from an impure mixture containing either or both of beta picoline and 2,6-lutidine in addition to the gamma picoline.

According to the present invention, it has now been found that gamma-picoline in substantially pure form, in some cases 100% pure form, can be separated from mixtures of the base with beta picoline and/or 2,6-lutidine by the formation of the relatively insoluble cupric chloride-ammine complex of gamma-picoline under the conditions noted hereinafter.

Ternary mixtures containing 20% to 50% gamma-picoline, 30% to 60% beta-picoline and 10% to 40% 2,6-lutidine are preferably employed. Binary mixtures containing 20% to 80% gamma-picoline with correspondingly 80% to 20% of either beta-picoline or 2,6-lutidine also can be used.

The success of the invention is due to a large extent to the discovery that, when a sufficiently dilute aqueous solution, containing gamma picoline and beta picoline and/or 2,6-lutidine, is treated with cupric sulfate so that no precipitate forms and then sodium chloride is added, the gamma picoline complex is preferentially precipitated. In fact, the gamma picoline complex is precipitated from such a mixture even with low concentrations of salt. On the other hand, the beta-picoline complex cannot be precipitated under corresponding conditions even when the complex has been prepared from pure beta-picoline. No complex at all appears to be formed with 2,6-lutidine either with copper sulfate or with copper sulfate followed by the sodium chloride treatment.

While the claims are not limited by the particular theory of reaction, a possible mechanism is as follows:

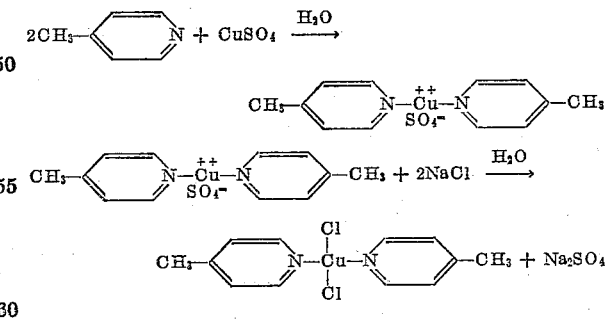

The above gamma-picoline copper chloride complex is a deep blue solid stable even at 100° C. The solid complex is broken up and the gamma-picoline recovered, however, by treating the solid complex with aqueous sodium hydroxide, potassium hydroxide or other alkali, distilling to obtain gamma-picoline and drying the gamma-picoline over solid sodium hydroxide.

By using dilute solutions to form the complex or by dissolving and re-precipitating the complex after initial formation and precipitation, gamma-picoline can be recovered in the purest form, although, with some sacrifice in operating economy.

For best results, the precipitated gamma picoline cupric chloride complex should be dried before the addition of sodium hydroxide or other alkali solution used to break down the complex. After the alkali treatment, the mixture is then subjected to steam distillation, filtration or other conventional treatment, to recover the gamma picoline. Elimination of the drying step and simply filtering and decomposing the wet complex gives a gamma picoline end product with increased contamination of beta-picoline and 2,6-lutidine, although still considerably enriched in gamma picoline compared to the original mixture.

An alternative method of reaction comprises:

1. Mixing the beta picoline, gamma picoline and 2,6-lutidine mixture with aqueous copper sulfate solution, sufficient water being present to prevent precipitation of the beta-picoline complex;
2. Addition of sodium chloride with vigorous stirring;
3. Steam distillation until only a green or blue precipitate remains (the gamma picoline-cupric chloride addition compound);
4. Addition of sodium hydroxide solution;
5. Steam distillation until only a black precipitate (this contains copper oxide) remains.

In this alternative process, the 2,6-lutidine and beta-picoline are removed in step 3. While this method has the advantage of giving a pure gamma picoline it has the disadvantage that the gamma picoline complex is somewhat unstable under the steam distillation of step 3 and, hence, the yield of purified gamma picoline is lowered to some extent.

Instead of using cupric sulfate followed by the addition of sodium chloride, it is also possible to employ cupric chloride directly in place of cupric sulfate and eliminate the subsequent sodium chloride treatment. However, it has been found preferable to employ the cupric sulfate and sodium chloride procedure.

The order of mixing the gamma picoline and beta picoline and/or 2,6-lutidine mixture with the cupric sulfate solution is not of the utmost criticality. The preferred order is, however, the addition of the base mixture to the aqueous copper sulfate solution. This prevents the precipitation even of small amounts of copper sulfate-picoline, e. g., beta picoline, complexes.

The amount of cupric sulfate is not particularly critical. For most complete yields, however, the copper sulfate should be present in the amount of one mol per mol of gamma picoline in the base mixture. Lesser amounts of copper sulfate will reduce the overall yield and larger amounts are wasteful. In general, 0.27 mol to 0.50 mol of cupric sulfate per mol of gamma picoline are employed. Anhydrous copper sulfate can be employed, as can hydrated copper sulfate, e. g., cupric sulfate pentahydrate.

The amount of sodium chloride used should be at least in the ratio of two mols per mol of copper sulfate to insure complete reaction, although lesser amounts have been employed with a reduction in yield. In general, 2 mols to 10 mols of salt per mol of cupric sulfate are used. Excess sodium chloride over the 2 to 1 ratio is desirable, however, to help salt out the gamma picoline complex, as well as to influence the reaction. The sodium chloride can be introduced either as a solid or an aqueous solution of low or high concentration. Solutions have been used of 50% or less saturation up to completely saturated solutions with equal success. The sodium chloride can be introduced all at once or portion-wise.

The temperature of reaction is not critical. Room temperature, e. g., 21° C., can be used conveniently. The reaction is somewhat exothermic in nature, the general temperature rise being about 5 to 20° C.

The use of steam distillation, wherever referred to above, can be replaced by straight distillation, although normally, steam distillation is preferred. Thus, in the alternative method step 3, outlined above, if straight distillation is employed, there is a greater amount of undesired complex decomposition, due to local overheating.

The sodium hydroxide or other alkali employed to break up the gamma-picoline complex can be added to the complex dispersed in water either as a solid or in solution. Preferably, two mols of sodium hydroxide as a 50% aqueous solution are added per mol of complex. More sodium hydroxide can be added, the exact amount not being critical.

The total amount of water used in the copper sulfate-gamma picoline reaction mixture can be varied within wide limits. The preferred amount is the minimum quantity of water required to prevent any precipitate of beta-picoline-copper sulfate complex from forming. This will result in a maximum precipitate of the gamma picoline complex upon the addition of sodium chloride. Sufficient water should be present to permit vigorous stirring to effect homogeneity. In general, 2 parts to 3 parts of water by weight are employed per part of the total of gamma picoline, beta picoline and 2,6-lutidine. The same proportions of water can be used when cupric chloride is used to form the complex.

Example I

Into a 3-neck flask, equipped with stirrer, thermometer, and dropping funnel, is added:

196 grams of anhydrous cupric sulfate (cupric sulfate pentahydrate in corresponding molar amount may also be used) and 2500 grams of water. The stirrer is started, and to this mixture is added, slowly, 1000 grams of beta, gamma picoline fraction (42.5% gamma, 27.3% beta, 30.2% 2,6-lutidine). The temperature rises 10 to 20° C. After 15 minutes of stirring, 650 grams sodium chloride is added. Stirring is continued for one hour. The dark-blue precipitate, consisting of shiny platelets, is filtered and washed in saturated NaCl solution. The weight of the wet cake is 805 grams. After air drying, the cake weighs 373 grams. For the next step, an aliquot of this dry cake is used.

65 grams of the cake is dissolved in 250 grams of water with stirring in a distilling flask. To this mixture is added 48 grams of 50% sodium hydroxide. After refluxing the mixture for two to two and one-half hours, 93.1 grams of aqueous gamma-picoline is distilled into a chilled flask. The water is removed by drying over solid caustic soda.

According to a titration analysis, the 65 grams of copper picoline complex yielded 29.4 grams of gamma-picoline. This is equivalent to 169 grams of gamma-picoline from the total cake weight of 373 grams. Infra-red analysis shows the analysis to be 94.2% gamma-picoline, 2.5% beta-picoline, 3.3% 2,6-lutidine. The yield of pure gamma is thus approximately 159 grams out of a possible 25 grams or 37.5%, based on the gamma-picoline. This is a yield of 68% of theory, based on the copper sulfate which is the limiting factor on yield in this example.

Example II

To 200 grams of impure picoline base mixture (32.9% gamma-picoline, 34.3% beta-picoline and 32.8% 2,6-lutidine) there were added 39.2 grams of cupric sulfate (anhydrous) in 500 grams of water with stirring. Then, there were added 45 grams of sodium chloride. The precipitate was filtered off and to the filtrate were added 30 grams of sodium chloride. The new precipitate was filtered off and to the filtrate was added 60 grams of sodium chloride. The precipitate was recovered by filtration and combined with the two previous precipitates. The dry weight of the combined precipitates was 66 grams. After drying, the combined precipitates were dissolved in 250 grams of water and the mixture steam distilled and the distillate dried over solid sodium hydroxide. The dry distillate was 100% gamma picoline according to infra-red analysis.

Example III

To 200 grams of the same impure gamma picoline mixture as in Example I, there was added 39.2 grams of cupric sulfate (anhydrous) in 100 grams of water. There were then added 45 grams of sodium chloride and the precipitate removed by filtration. The filtrate was slurried with 200 grams of saturated salt solution, the precipitate filtered off and the filtrate again slurried with 200 grams of saturated salt solution. The precipitate was combined with the two prior precipitates. Half of the total precipitates were washed with 50 ml. of water. This washing was repeated four times and then the solid product was washed three times with 50 ml. of methanol each time. The product was dried at 105° C. for one hour and then analyzed.

*Analysis.* — N=8.33%, Cl=22.62%, Cu=19.96% (calculated for

theoretical is N=8.74%, Cl=22.11% and Cu=19.81%). Tests for water, hydroxide and sulfate were all negative.

Example IV

Five grams of copper sulfate (anhydrous) were dissolved in 100 grams of water. The mixture was added to 25 grams of impure gamma-picoline (32.9% gamma-picoline; 34.3% beta-picoline and 32.8% 2,6-lutidine). Then, there were added 15 grams of sodium chloride. The blue complex formed was removed by filtration, washed with 100 cc. of 15% aqueous sodium chloride and dried, to give 12.3 grams of solid product. This solid was dissolved in excess 50% sodium hydroxide and the mixture steam distilled until the odor of picoline was absent from the distilling flask. The filtrate was treated with pellets of sodium hydroxide. The gamma-picoline separated out was decanted and treated again with pellets of sodium hydroxide. The dry gamma-picoline contained, by infra-red analysis, no 2,6-lutidine and only traces of beta-picoline.

The following examples illustrate formation of the gamma-picoline complex from cupric chloride.

Example V

To 125 grams of the same impure gamma-picoline mixture as in Example I, there were added 38.3 grams of cupric chloride dissolved in 500 grams of water. The addition was made dropwise with stirring. Stirring was continued for one hour after addition was complete. The precipitate was filtered out on a centrifuge and the filter cake was washed with a solution of 33.3 grams of sodium chloride dissolved in 100 grams of water. To the washed filter cake were added 46.8 grams of 50% aqueous sodium hydroxide. The gamma picoline was distilled out while adding an equivalent quantity of water to the distillation flask. The yield of gamma picoline was 28.9 grams (54.5% of theory).

Example VI 63.0 grams of copper chloride (enough to theoretically complex all the beta-and gamma-picoline present in the starting mixture) was dissolved in 500 grams of water. There were then added 3.4 grams of a non-ionic detergent, specifically, Antarox A 201 (an alkylphenol-polyethylene glycol ether) and the mixture stirred. There was added slowly with stirring 125 grams of the same impure gamma-picoline mixture as in Example I (containing 53.1 grams of gamma picoline, 34.15 grams of beta picoline and 37.65 grams of 2,6-lutidine). The mixture was stirred one hour after addition was complete, the product then centrifuged and the solid complex washed with 370 ml. of water. The solid complex was dissolved in 300 ml. of water and 50 ml. of 50% aqueous sodium hydroxide added and gamma picoline recovered in the conventional product. The yield was 37.6 grams (70.1%).

We claim:

1. A process of preparing

comprising (*a*) condensing gamma-picoline with cupric sulfate and (*b*) condensing the product of step *a* with sodium chloride.

2. A process according to claim 1, in which step *a* is carried out in the presence of sufficient water to prevent a precipitate from forming prior to the addition of the sodium chloride.

3. A process for separating gamma-picoline from a mixture thereof with at least one member of the group consisting of beta-picoline and 2,6-lutidine comprising treating the mixture with a cupric salt and with a chloride in the presence of sufficient water to prevent the precipitation of a beta-picoline copper complex, separating the gamma-picoline-cupric chloride addition compound as a precipitate and recovering the purified gamma-picoline from the separated addition compound.

4. A process for separating gamma picoline from a mixture thereof with at least one base selected from the group consisting of beta picoline and 2,6-lutidine which comprises treating the mixture with copper sulfate in the presence of sufficient water to prevent any substantial precipitation of the beta picoline-copper sulfate addition compound and then adding sodium chloride to the mixture to precipitate gamma picoline in the form of its copper chloride addition compound and separating the addition compound so precipitated.

5. The process of claim 4, wherein at least two mols of sodium chloride are used per mol of copper sulfate.

6. The process of claim 5, wherein the initial mixture of bases comprises 20% to 50% gamma-picoline, 30% to 60% beta-picoline and 10% to 40% 2,6-lutidine.

7. The process of claim 6, in which the precipitate is dried and then dissolved in water and the gamma-picoline is recovered from this aqueous mixture.

8. A process for separating gamma-picoline from a mixture thereof with at least one base selected from the group consisting of beta-picoline and 2,6-lutidine which comprises treating the mixture with aqueous cupric chloride to precipitate gamma-picoline in the form of its copper chloride addition compound and separating the addition compound so precipitated.

9. The process of claim 8, wherein the initial mixture of bases comprises 20% to 50% gamma picoline, 30% to 60% beta-picoline and 10% to 40% 2,6-lutidine.

10. The process of claim 9, in which the precipitate is dried and then dissolved in water and the gamma picoline is recovered from the aqueous mixture.

11. The process of claim 4, in which the beta-picoline and 2,6-lutidine are removed by distillation after formation of the gamma picoline-copper chloride addition compound precipitate.

12. The process of claim 11, in which the distillation is a steam distillation.

13. A process for recovering gamma picoline of increased purity from an aqueous mixture thereof with at least one of the bases beta-picoline and 2,6-lutidine which comprises preferentially precipitating the cupric chloride addition compound of gamma picoline from the aqueous mixture and separating the addition compound thus precipitated.

14. The process of claim 13, comprising the additional step of treating the separated addition compound to liberate gamma picoline therefrom.

15. A process according to claim 3, wherein from 2 to 10 mols of sodium chloride are used per mol of copper sulfate.

16. A process according to claim 13, wherein at least 2 parts of water are employed for each part of gamma picoline present.

References Cited in the file of this patent

FOREIGN PATENTS 701,179   Great Britain ---------- Dec. 16, 1953

OTHER REFERENCES

Baudet Compte Rendus, vol. 234, pp. 2454–2456 (1952).

Ploquin Compte Rendus, vol. 233, pp. 162–164 (1951).